United States Patent
Oyama

(10) Patent No.: US 7,389,004 B2
(45) Date of Patent: Jun. 17, 2008

(54) IMAGE PROCESSING APPARATUS

(75) Inventor: Eiji Oyama, Yokohama (JP)

(73) Assignee: Canon Kabushiki Kaisha (JP)

( * ) Notice: Subject to any disclaimer, the term of this patent is extended or adjusted under 35 U.S.C. 154(b) by 567 days.

(21) Appl. No.: 11/182,922

(22) Filed: Jul. 15, 2005

(65) Prior Publication Data

US 2006/0012706 A1    Jan. 19, 2006

(30) Foreign Application Priority Data

Jul. 16, 2004    (JP)    ............... 2004-210592

(51) Int. Cl.
*G06K 9/32*    (2006.01)
(52) U.S. Cl. ..................... 382/299; 382/148
(58) Field of Classification Search .................. 341/28, 341/131; 345/26, 467, 472.1, 670, 671, FOR. 116, 345/139, 149, 150, 161, 162; 348/14.12, 348/208.13, 589, 600, 333.11, E13.017, E5.051, 348/E11.013; 382/148, 299, 301; 386/E9.041, 386/E5.025
See application file for complete search history.

(56) References Cited

U.S. PATENT DOCUMENTS 6,252,590 B1 *    6/2001    Sawai et al. ................ 345/667

2003/0137522 A1 *    7/2003    Kaasila et al. .............. 345/619

FOREIGN PATENT DOCUMENTS

JP    10-124021 A    5/1998

* cited by examiner

*Primary Examiner*—Matthew C. Bella
*Assistant Examiner*—Gregory F Cunningham
(74) *Attorney, Agent, or Firm*—Rossi, Kimms & McDowell, LLP

(57) ABSTRACT

A signal processing apparatus comprises an input unit for inputting first image data having a first resolution, a resolution converting unit for converting the resolution of the input first image data and outputting second image data having a second resolution which is lower than the first resolution, a character data producing unit for producing first character data in accordance with the second resolution, an enlargement unit for enlarging the first character data to produce second character data in accordance with the first resolution, a first multiplexing unit for multiplexing the input first image data and the second character data to produce first multiplex image data, and a second multiplexing unit for multiplexing the second image data output from the resolution converting unit and the first character data output from the character data producing unit to produce second multiplex image data.

11 Claims, 9 Drawing Sheets

LINE THINNING-OUT

FOUR-PIXEL AVERAGE THINNING-OUT

US 7,389,004 B2

IMAGE PROCESSING APPARATUS

BACKGROUND OF THE INVENTION

1. Field of the Invention

The present invention relates to an image processing apparatus, particularly to a multiplexing process of a character image signal.

2. Description of the Related Art

It has heretofore been known that character images are multiplexed and displayed when an image is displayed in a television monitor or the like.

Moreover, in recent years, there has appeared a TV monitor capable of displaying a wide image having an aspect ratio of 16:9 in addition to a conventional normal image having an aspect ratio of 4:3. In Japanese Patent Application Laid-Open No. 10-124021 (having a corresponding U.S. Pat. No. 6,252,590), there is described an apparatus which multiplexes and displays character image data with respect to the normal and wide images.

A constitution described in the above-described publication will be described with reference to FIG. 12.

There are prepared wide parts 1201, common parts 1202, and normal parts 1203. Image data of a GUI screen to be displayed in a wide monitor 1204 is produced using the wide parts 1201 and the common parts 1202. Image data of a GUI screen to be displayed in a normal monitor 1205 is produced using the common parts 1202 and the normal parts 1203.

However, in the constitution of FIG. 12, the wide parts 1201, the common parts 1202, and the normal parts 1203 are required. When the number (resolution) of pixels of the image data to be handled per screen increases, a data amount also increases. Therefore, there has been a problem that a large scale of a circuit required in image processing, such as a memory, is required.

In recent years, there has appeared a video camera which can record/reproduce high-definition (HD) image data in addition to standard-definition (SD) image data.

Also in this type of video camera, the character image data is multiplexed onto an output image thereof and output.

Therefore, in a portable apparatus like the video camera, the large circuit scale is unfavorably required in a case where the character image data is multiplexed onto an HD signal.

SUMMARY OF THE INVENTION

An object of the present invention is to provide a signal processing apparatus which solves this problem.

Another object of the present invention is to provide an apparatus capable of multiplexing character image data onto an image signal having a various resolution without enlarging a circuit scale.

To achieve this object, according to one aspect of the present invention, a signal processing apparatus of the present invention comprising:

input means for inputting first image data having a first resolution;

resolution converting means for converting the resolution of the first image data input by the input means and outputting second image data having a second resolution which is lower than the first resolution;

character data producing means for producing first character data in accordance with the second resolution;

enlargement means for enlarging the first character data output from the character data producing means to produce second character data in accordance with the first resolution;

first multiplexing means for multiplexing the first image data input by the input means and the second character data output from the enlargement means to produce first multiplex image data; and second multiplexing means for multiplexing the second image data output from the resolution converting means and the first character data output from the character data producing means to produce second multiplex image data.

DESCRIPTION OF THE EMBODIMENTS

Embodiments of the present invention will be described hereinafter in detail with reference to the drawings.

Figure 1:
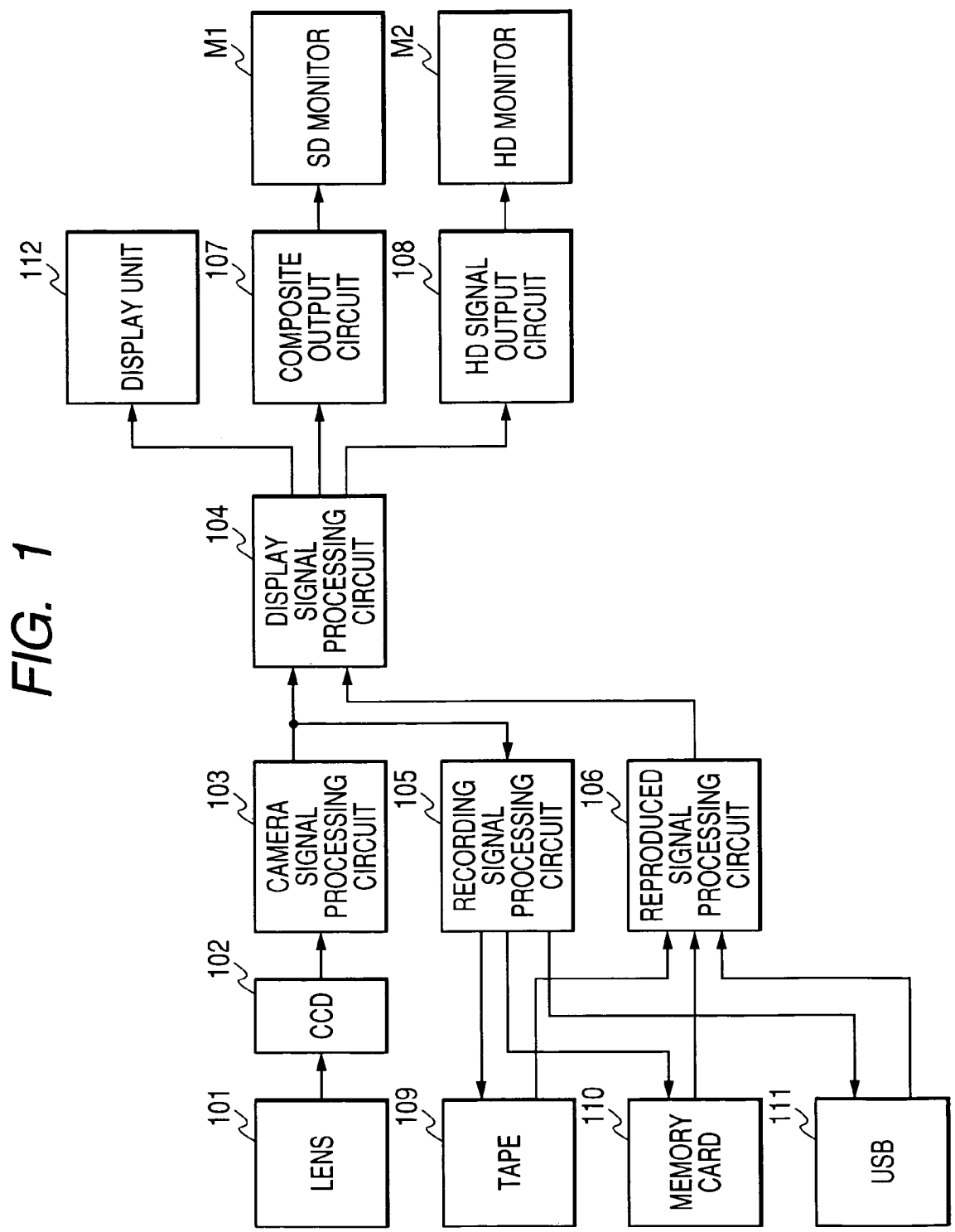
FIG. 1 is a diagram showing a constitution of a video camera according to an embodiment of the present invention.

FIG. 1 is a diagram showing a constitution of a video camera to which the present invention is applied. The video camera of FIG. 1 is capable of recording/reproducing high-definition (HD) moving image data.

In FIG. 1, at an image capturing, data of a moving image of an object obtained via a lens 101 is produced by a CCD 102, and output to a camera signal processing circuit 103. The camera signal processing circuit 103 subjects moving image data from the CCD 102 to known camera signal processing, and outputs the processsd data to a display signal processing circuit 104 and a recording signal processing circuit 105. The recording signal processing circuit 105 encodes the output moving image data in accordance with a known MPEG system to compress a data amount, and records the encoded data in a tape 109 or a memory card 110. The moving image data is transmitted to the outside by a USB circuit 111.

The display signal processing circuit 104 processes the moving image data output from the camera signal processing circuit 103 as described later to produce image data to be displayed, and outputs the data to a display unit 112, a multiplex output circuit 107, and an HD signal output circuit 108. The display unit 112 is constituted of, for example, a liquid crystal panel or the like. The multiplex output circuit 107 outputs to an SD monitor M1 SD image data onto which character image data is multiplexed. The HD signal output circuit 108 outputs to an HD monitor M2 HD image data onto which the character image data is multiplexed.

Moreover, at a reproduction, a reproduced signal processing circuit 106 reproduces HD moving image data from the tape 109 or the memory card 110. Moreover, the circuit decodes the reproduced moving image data, and outputs the decoded data to the display signal processing circuit 104. The display signal processing circuit 104 multiplexes the character image data with the reproduced moving image data as described later, and outputs the multiplexed data to the display unit 112, the multiplex output circuit 107, and the HD signal output circuit 108 in the same manner as in the image capturing time.

Next, the display signal processing circuit 104 will be described.

Figure 2:
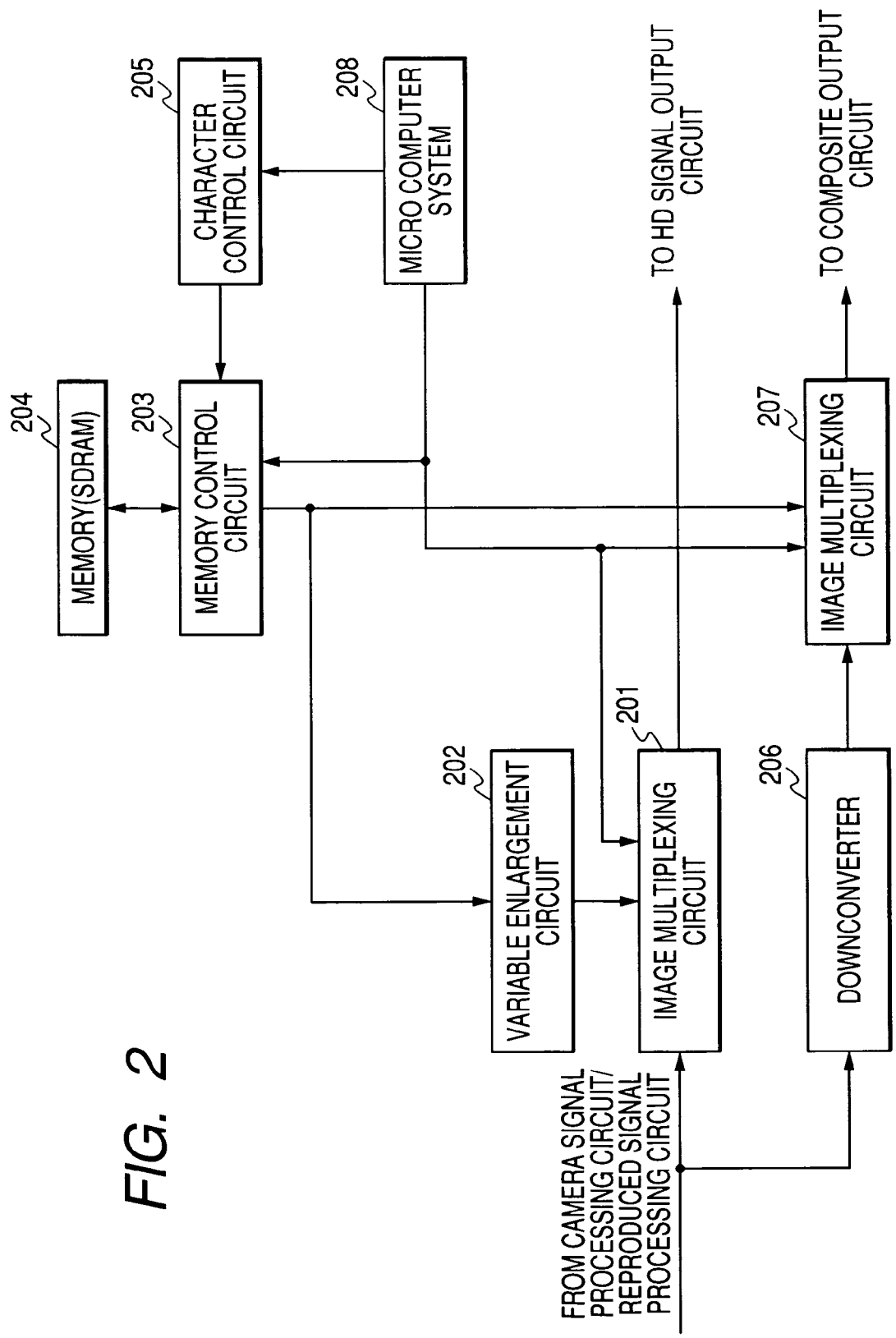
FIG. 2 is a diagram showing a constitution of a display signal processing circuit in a first embodiment.

FIG. 2 is a block diagram showing a constitution of the display signal processing circuit 104.

The HD image data output from the camera signal processing circuit 103 or the reproduced signal processing circuit 106 is supplied into two courses. In one of the courses, the number of pixels is reduced by a downconverter 206 to be converted to the SD image data having an aspect ratio of 4:3 and a standard resolution. An image multiplexing circuit 207 multiplexes the SD image data from the downconverter 206 with SD bitmap data indicating the character image data for SD image output from a memory control circuit 203, and outputs the multiplexed data to the multiplex output circuit 107.

On the other hand, an image multiplexing circuit 201 multiplexes the input HD image data with HD bitmap data indicating the character image data for HD image supplied from a variable enlargement circuit 202, and outputs the multiplexed data to the HD signal output circuit 108.

Figure 3:
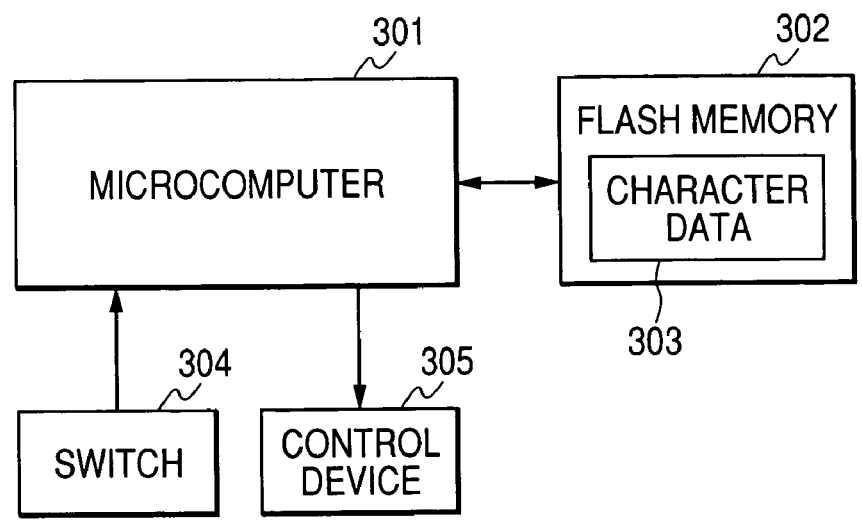
FIG. 3 is a diagram showing a constitution of a microcomputer system.

As shown in FIG. 3, a microcomputer system 208 comprises a microcomputer 301 and a memory 302 which stores a program for operating the microcomputer 301. Character data 303 is also stored in the memory 302. Furthermore, the microcomputer 301 is controlled by a switch 304 to control a various device 305. This microcomputer system 208 controls a character control circuit 205 based on the character data stored in the memory 302, and develops the bitmap data corresponding to the character image data for SD image data into an SDRAM 204 via the memory control circuit 203 to store the data temporarily therein.

Moreover, the microcomputer system 208 controls the memory control circuit 203 based on data of a display position corresponding to each character data, and reads and outputs the bitmap data of each character data at a timing corresponding to the display position.

The bitmap data from the memory control circuit 203 is supplied to the variable enlargement circuit 202 and the image multiplexing circuit 207.

Figure 4:
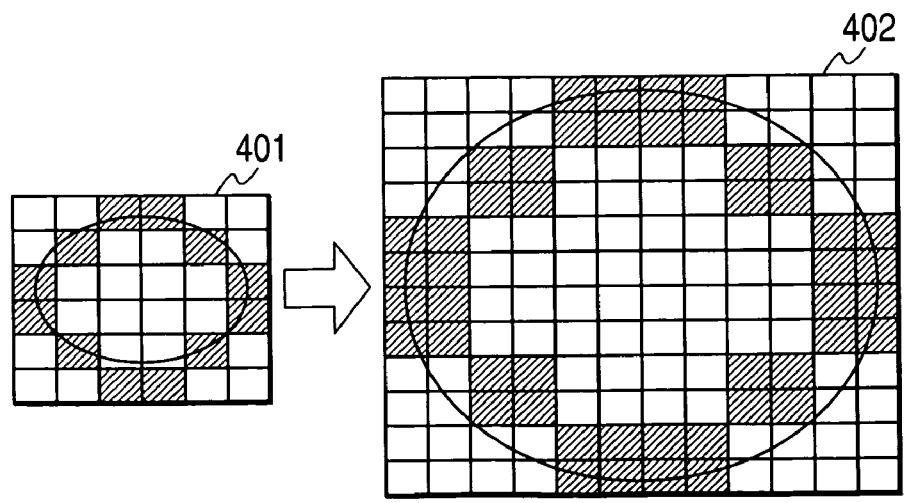
FIG. 4 is a diagram showing an enlarging process of bitmap data for SD.

The variable enlargement circuit 202 enlarges twice each of vertical and horizontal image sizes (the number of the pixels) of the bitmap data for SD image output from the memory control circuit 203 to produce the bitmap data for HD image. Specifically, as shown in FIG. 4, the circuit enlarges the vertical and horizontal sizes of bitmap data 401 for SD image twice, respectively, to produce the bitmap data in accordance with the character data for HD image.

The microcomputer system 208 controls the image multiplexing circuit 201 in accordance with the display position of the character data, and multiplexes the bitmap data for HD image from the variable enlargement circuit 202 with the input HD image data to be output as the image data for HD display.

Moreover, the microcomputer system 208 controls the image multiplexing circuit 207 in accordance with the display position of the character image data, and multiplexes the bitmap data for SD image from the memory control circuit 203 with the image data from the downconverter 206 without changing the data to be output as multiplex image data for SD display is output.

The image data for HD display from the image multiplexing circuit 201 is output to the HD monitor M2 having an aspect ratio of 16:9 via the HD signal output circuit 108 of FIG. 1. The multiplex image data for SD display from the image multiplexing circuit 207 is output to the SD monitor M1 having an aspect ratio of 4:3 via the multiplex output circuit 107 of FIG. 1.

A relation between a display area and a bitmap area will be described with reference to FIG. 5.

A display area 504 of the bitmap data for SD image is positioned slightly inside a display area 503 of the SD image, so that characters can be displayed equally horizontally and vertically.

Moreover, when the size of the bitmap data for SD image is enlarged four times to produce the bitmap data for HD image, the character data can be displayed in a display area 502 obtained by enlarging the vertical and horizontal sizes of the display area 503 for SD image twice, respectively. In this case, a display area 501 of the HD monitor is disposed in such a manner as to surround the display area 502.

Figure 6:
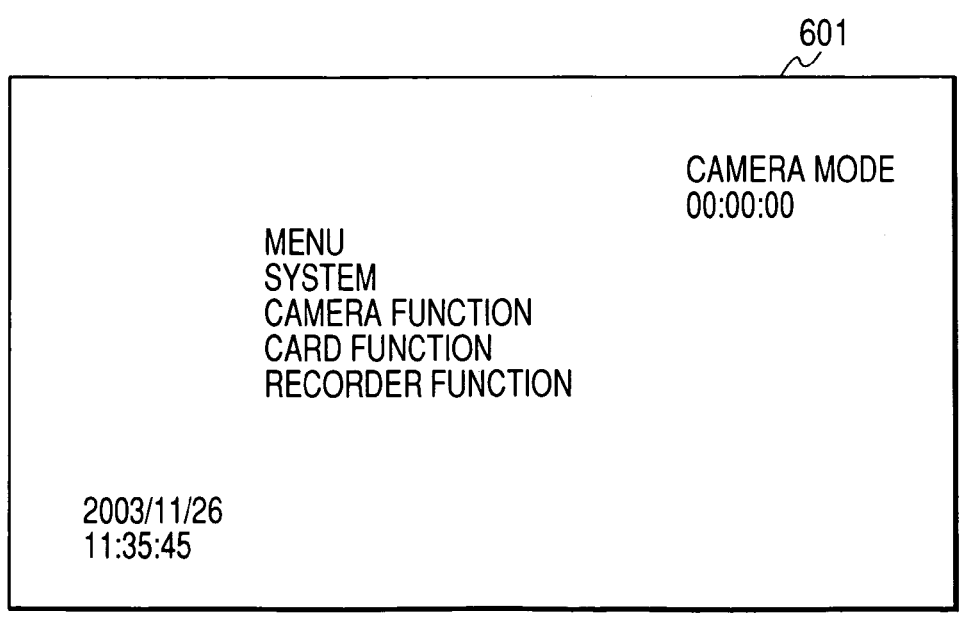
FIG. 6 is a diagram showing a state of a display screen of an SD image.
Figure 7:
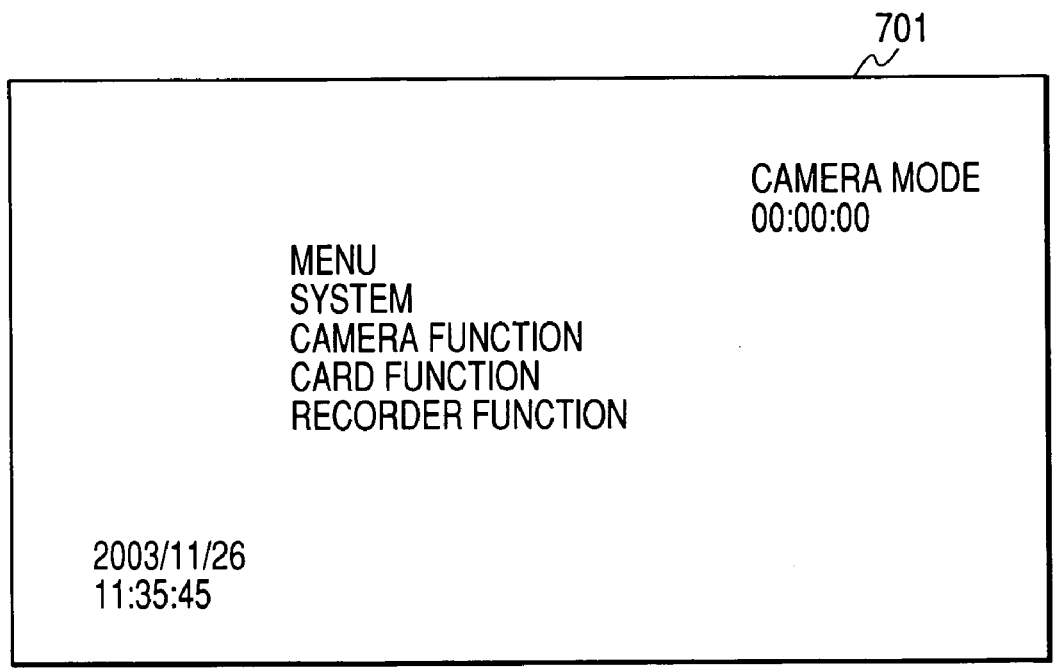
FIG. 7 is a diagram showing a state of a display screen of an HD image.

An example of a display screen of the SD monitor M1 is shown in 601 of FIG. 6, and an example of a display screen of the HD monitor M2 is shown in FIG. 7.

In the present embodiment, when an image obtained by multiplexing the character data with respect to the HD image is output to the SD and HD monitors, the bitmap data for SD is enlarged to produce the bitmap data for HD to be multiplexed with the HD image data. Therefore, the bitmap data for HD does not have to be prepared separately from the data for SD, and a capacity of the memory for storing the character data can be largely reduced.

Next, a second embodiment will be described.

Figure 8:
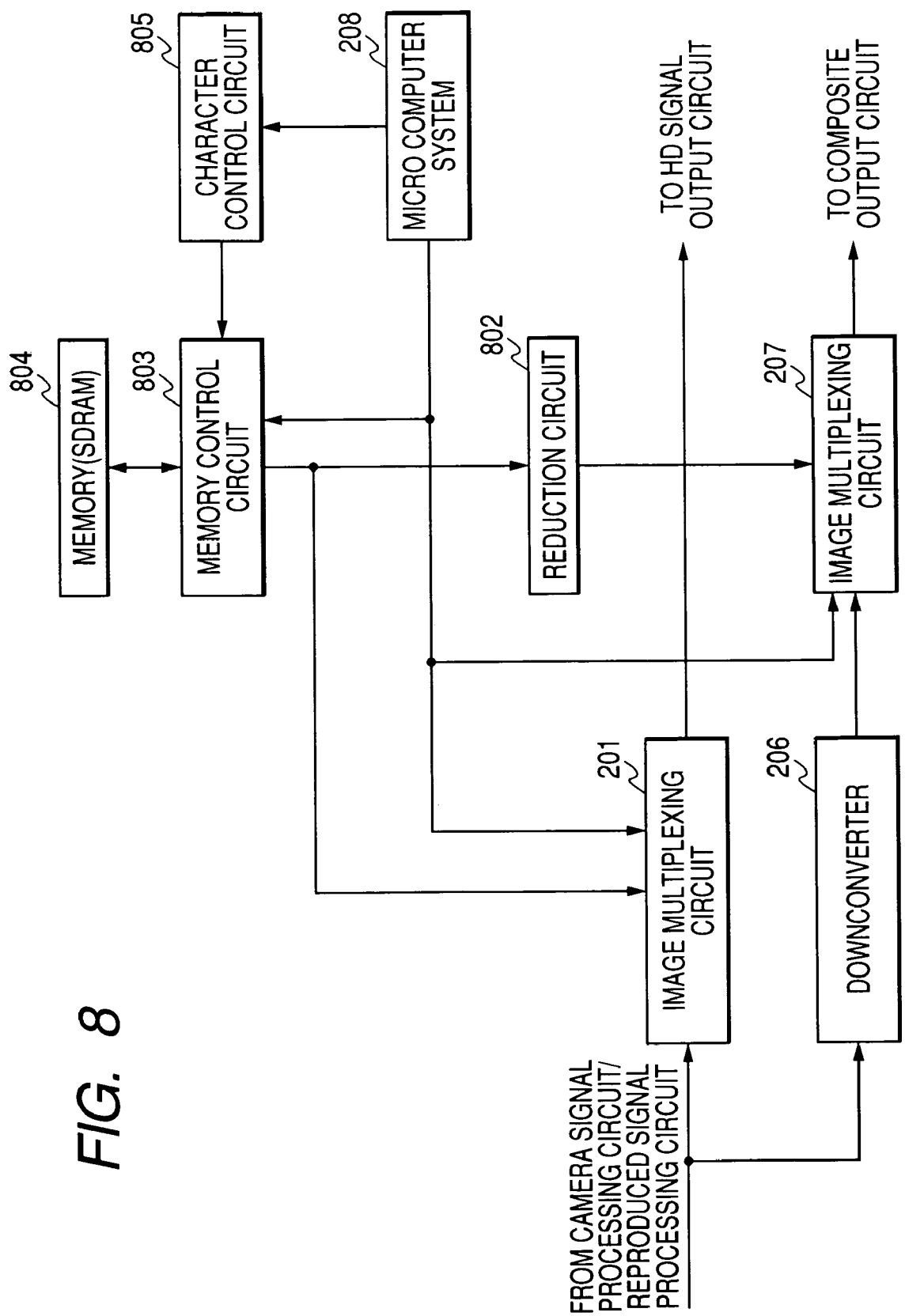
FIG. 8 is a diagram showing a constitution of the display signal processing circuit in a second embodiment.

FIG. 8 is a diagram showing a constitution of a display signal processing circuit 104 according to the second embodiment. It is to be noted that a constitution similar to that of FIG. 2 is denoted and described with the same reference numerals.

HD image data output from a camera signal processing circuit 103 or a reproduced signal processing circuit 106 is supplied into two courses. In one of the courses, the number of pixels is reduced by a downconverter 206 to be converted into SD image data having an aspect ratio of 4:3 and a standard resolution. An image multiplexing circuit 207 multiplexes the SD image data from the downconverter 206 with SD bitmap data indicating character image data for SD image output from a reduction circuit 802, and outputs the multiplexed data to a multiplex output circuit 107.

On the other hand, an image multiplexing circuit 201 multiplexes input HD image data with HD bitmap data indicating character image data for HD image supplied from a memory control circuit 803, and outputs the multiplexed data to an HD signal output circuit 108.

Moreover, character data is stored in a memory 302 of a microcomputer system 208. Furthermore, the microcomputer system 208 controls a character control circuit 805 based on the character data stored in the memory 302, and develops the bitmap data into an SDRAM 804 in accordance with the character image data for HD image via the memory control circuit 803 to store the data temporarily therein.

Moreover, the microcomputer system 208 controls the memory control circuit 803 based on data of a display position corresponding to each character data, and reads and outputs the bitmap data of each character data at a timing corresponding to the display position.

The bitmap data from the memory control circuit 803 is supplied to the reduction circuit 802 and the image multiplexing circuit 201.

Figure 9:
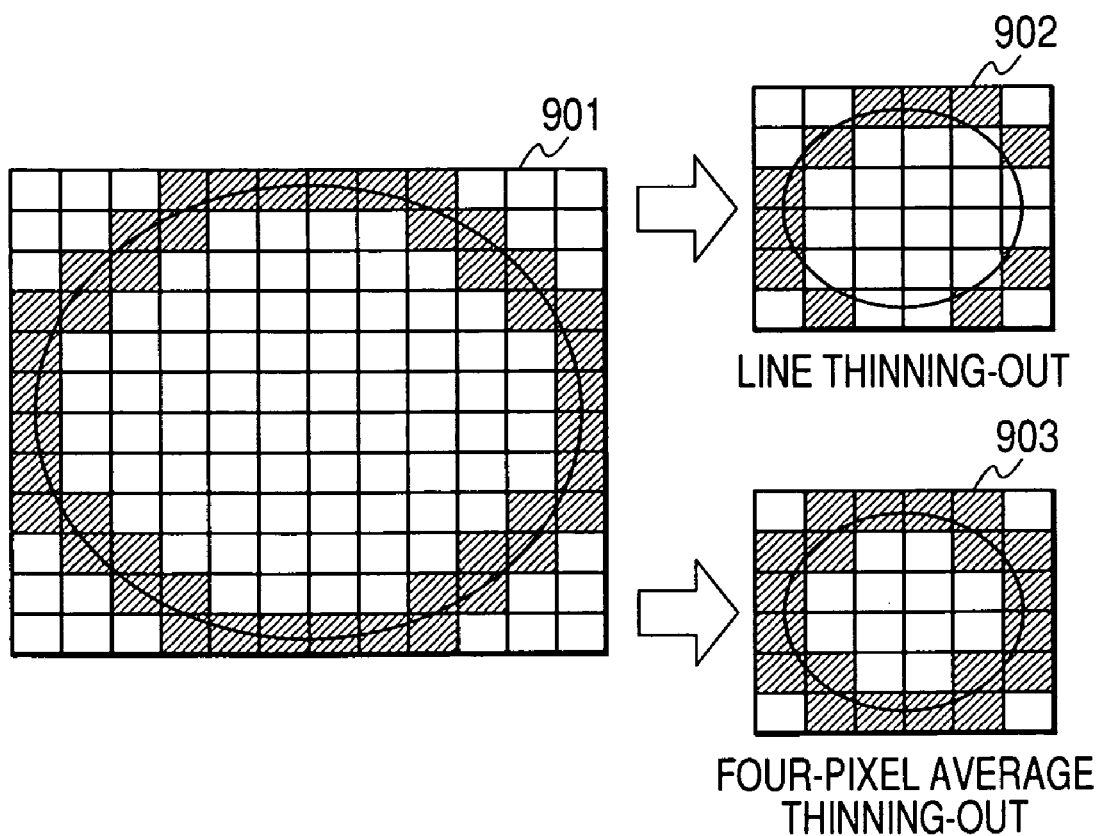
FIG. 9 is a diagram showing a reducing process of bitmap data for HD.

The reduction circuit 802 reduces vertical and horizontal image sizes (the number of the pixels) of the bitmap data for HD image output from the memory control circuit 803 into ½, respectively, to produce the bitmap data for SD image. Specifically, as shown in FIG. 9, the circuit reduces the vertical and horizontal sizes of bitmap data 901 for SD image into ½, respectively, to produce bitmap data 902 or 903 in accordance with the character data for SD image. The data 902 is an image obtained by thinning out the data every other pixel vertically and horizontally, respectively. In the present embodiment, as shown by 903, the bitmap data for SD image is produced using an average value of four pixels vertically and horizontally arranged adjacent to one another in the image 901 for HD.

The microcomputer system 208 controls the image multiplexing circuit 207 in accordance with the display position of the character image data, and multiplexes the bitmap data for SD image from the reduction circuit 802 with the image data from a downconverter 206 to be output as multiplex image data for SD display.

Moreover, the microcomputer system 208 controls the image multiplexing circuit 201 in accordance with the display position of the character data, and multiplexes the bitmap data for HD image from the memory control circuit 803 with the input HD image data, to be output as image data for HD display.

The image data for HD display from the image multiplexing circuit 201 is output to the HD monitor M2 having an aspect ratio of 16:9 via the HD signal output circuit 108 of FIG. 1. The multiplex image data for SD display from the image multiplexing circuit 207 is output to the SD monitor M1 having an aspect ratio of 4:3 via the multiplex output circuit 107 of FIG. 1.

Figure 5:
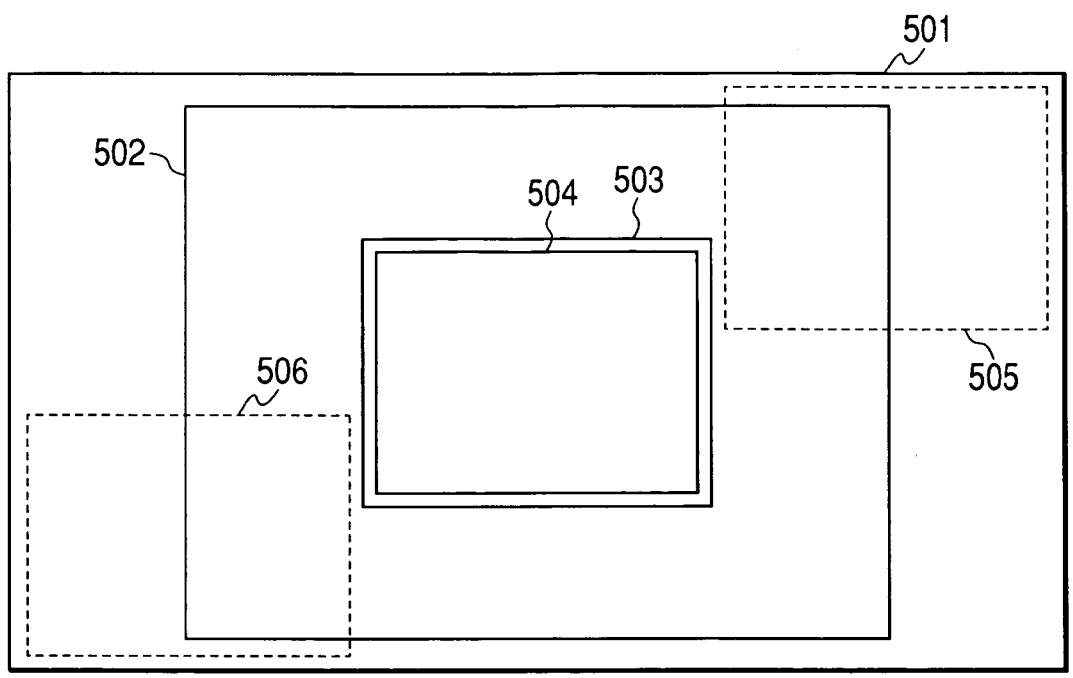
FIG. 5 is a diagram showing a display area of the bitmap data.

Also in the present embodiment, a state of a display screen is similar to that shown in FIG. 5.

In the present embodiment, when an image obtained by multiplexing the character data with respect to the HD image is output to SD and HD monitors, the bitmap data for HD is reduced to produce the bitmap data for SD, and the data is multiplexed with the SD image data. Therefore, the bitmap data for HD does not have to be prepared separately from the data for SD, and a capacity of the memory for storing the character data can be largely reduced.

Next, a third embodiment will be described.

Figure 10:
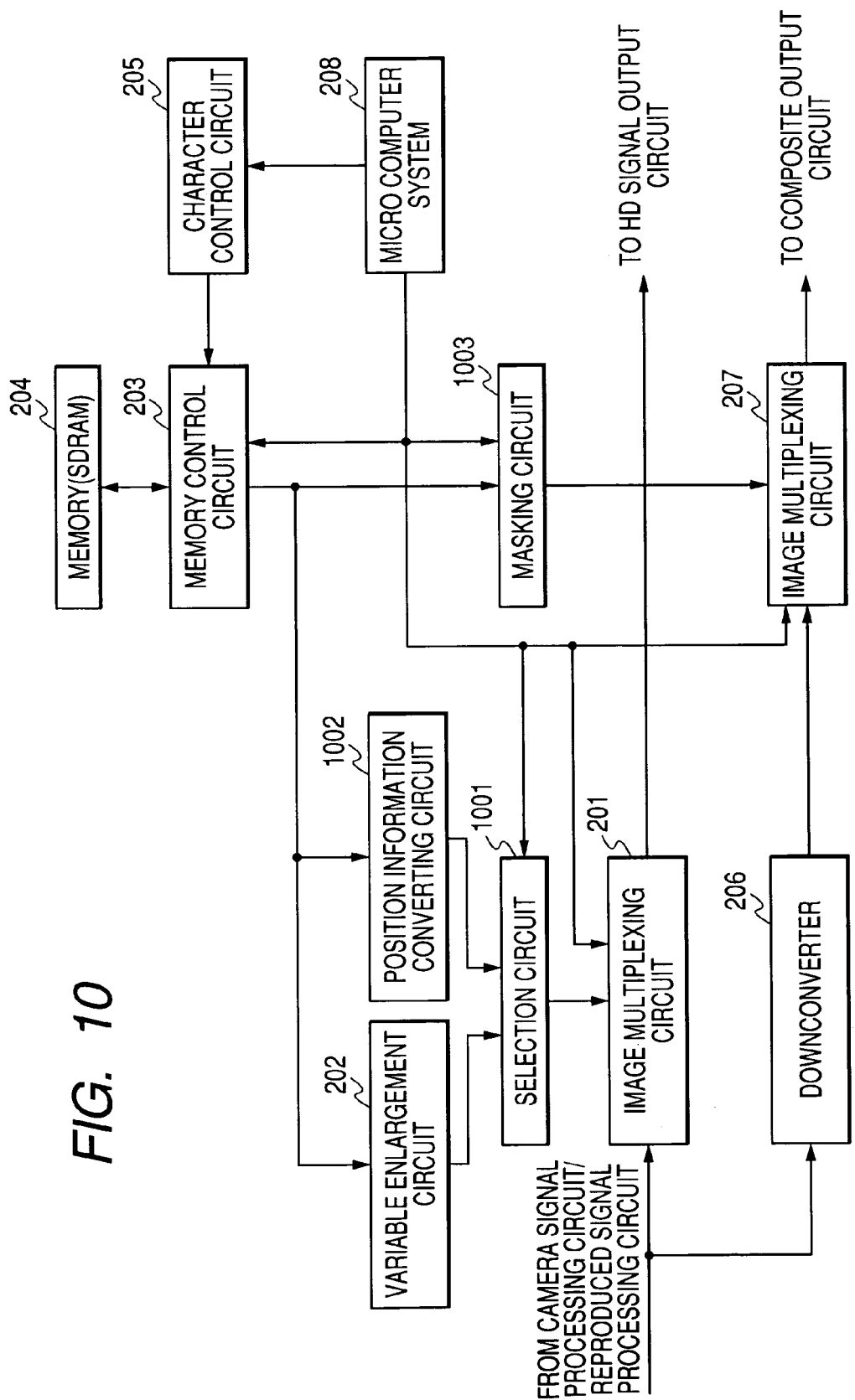
FIG. 10 is a diagram showing a constitution of the display signal processing circuit in a third embodiment.

FIG. 10 is a diagram showing a constitution of a display signal processing circuit 104 according to the third embodiment. It is to be noted that a constitution similar to that of FIG. 2 is denoted and described with the same reference numerals.

HD image data output from a camera signal processing circuit 103 or a reproduced signal processing circuit 106 is supplied into two courses. In one of the courses, the number of pixels is reduced by a downconverter 206, and data is converted into SD image data having an aspect ratio of 4:3 and a standard resolution. An image multiplexing circuit 207 multiplexes the SD image data from the downconverter 206 with SD bitmap data indicating character image data for SD image output from a memory control circuit 203 via a masking circuit 1003, and outputs the multiplexed data to a multiplex output circuit 107.

On the other hand, an image multiplexing circuit 201 multiplexes input HD image data with HD bitmap data indicating character image data for HD image supplied from a selection circuit 1001, and outputs the multiplexed data to an HD signal output circuit 108.

A microcomputer system 208 controls a character control circuit 205 based on the character data stored in a memory 302, and develops the bitmap data in an SDRAM 204 in accordance with the character image data for SD image data via the memory control circuit 203 to store the data temporarily therein in the same manner as in the embodiment of FIG. 2.

Moreover, the microcomputer system 208 controls the memory control circuit 203 based on data of a display position corresponding to each character data, and reads and outputs the bitmap data of each character data at a timing corresponding to the display position.

In the present embodiment, the bitmap data for SD image from the memory control circuit 203 is supplied to a variable enlargement circuit 202, a position information converting circuit 1002, and the masking circuit 1003.

The variable enlargement circuit 202 enlarges four times an image size of the bitmap data for SD image from the memory control circuit 203 to produce the bitmap data for HD in the same manner as in the first embodiment.

Moreover, the position information converting circuit 1002 changes an output timing, and outputs data to the selection circuit 1001 in order to change the display position of the bitmap data for SD image from the memory control circuit 203 to a predetermined display position. Specifically, for example, as shown in FIG. 5, the display position is converted in such a manner that the bitmap data for SD image from the memory control circuit 203 is displayed in a display area 505 corresponding to an upper right portion of a display area for HD, or a display area 506 corresponding to a lower left portion of the display area for HD.

In this case, unlike the variable enlargement circuit 202, the bitmap data is output without enlarging the image size of the data. Therefore, bitmap data indicating character data ¼ times that for HD is output from the position information converting circuit 1002.

In response to an instruction from the microcomputer system 208, the selection circuit 1001 selects one of the bitmap data for HD from the variable enlargement circuit 202 and the bitmap data from the position information converting circuit 1002 to output the selected data to the image multiplexing circuit 201. Therefore, the image multiplexing circuit 201 multiplexes the bitmap data for HD and the bitmap data having an SD image size with respect to the input HD image data and outputs the multiplexed information to a position corresponding to the instruction by the microcomputer system 208.

Moreover, the masking circuit 1003 masks a part of the bitmap data for SD from the memory control circuit 203 to output the data to the image multiplexing circuit 207 in accordance with the instruction from the microcomputer system 208.

A relation between a display area and a bitmap area in the present embodiment will be described with reference to FIG. 5.

A display area 504 of the bitmap data for SD image is positioned slightly inside a display area 503 of the SD image, so that characters can be displayed equally horizontally and vertically.

Moreover, when the size of the bitmap data for SD image is enlarged four times to produce the bitmap data for HD image, the character data can be displayed in a display area 502 obtained by enlarging vertical and horizontal sizes of the display area 503 for SD image twice, respectively. In this case, a display area 501 of an HD monitor is arranged in such a manner as to surround the display area 502.

Furthermore, the position information converting circuit 1002 can display character data having an image size for SD in an upper right display area 505 or a lower left display area 506 in the HD display area 501. In the present embodiment, each of the display areas 505 and 506 has a size equal to that of the display area 503 for SD.

As shown in FIG. 5, when the bitmap data for SD is enlarged four times, and the display area is also enlarged four times as shown by 502, as shown in FIG. 7, character data is displayed at a position little distant from a left end portion or a right end portion of the display screen.

To solve the problem, in the present embodiment, the position information converting circuit 1002 changes the display area to the display area 505 or 506 of FIG. 5, so that even in the HD image, the character data can be displayed in the left or right end portion of the screen.

Figure 11:
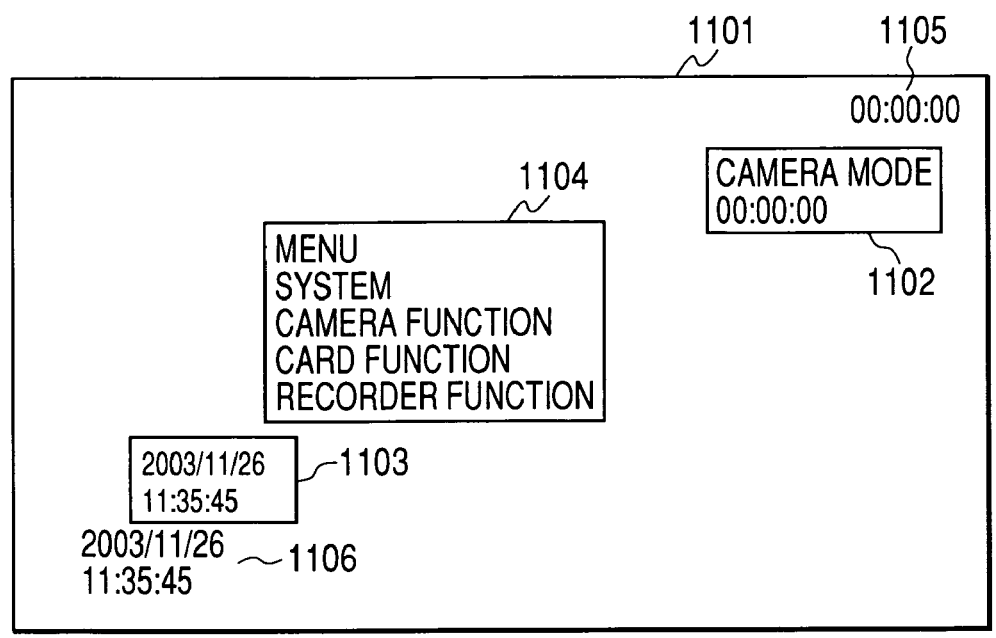
FIG. 11 is a diagram showing a state of the display screen of the HD image.
Figure 12:
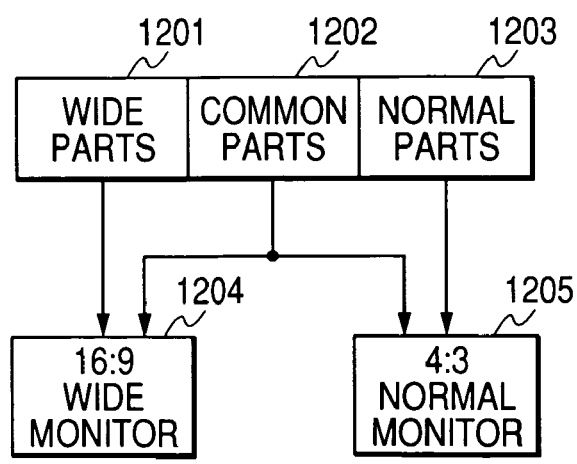
FIG. 12 is a diagram showing a constitution of a conventional image processing circuit.

FIG. 11 shows a state of the display screen of the HD image in the present embodiment.

In FIG. 11, 1102 and 1103 show display positions of character data in a case where bitmap data for SD is multiplied by four and multiplexed as such.

In the present embodiment, the position information converting circuit 1002 changes the display positions of the character data 1102, 1103 to 1105, 1106, respectively. On the other hand, as to character data 1104 in a middle of the screen, the bitmap data for SD multiplied by four is multiplexed as such.

The object of the present invention can also be achieved by providing a storage medium storing program codes for performing the aforesaid processes to an image processing apparatus, reading the program codes, by a CPU or MPU of the image processing or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read by a CPU of the image processing apparatus, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the image processing apparatus or in a memory provided in a function expansion unit which is connected to the image processing apparatus, CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore to apprise the public of the scope of the present invention, the following claims are made.

This application claims priority from Japanese Patent Application No. 2004-210592 filed Jul. 16, 2004, which is hereby incorporated by reference herein.

What is claimed is:

1. A signal processing apparatus comprising:
   input means for inputting first image data having a first resolution;
   resolution converting means for converting the resolution of the first image data input by the input means and output second image data having a second resolution which is lower than the first resolution;
   character data producing means for producing first character data in accordance with the second resolution;
   enlargement means for enlarging the first character data output from the character data producing means to produce second character data in accordance with the first resolution;
   selected means for selecting one of the first character data produced by the character data producing means and the second character data output from the enlargement means;
   first multiplexing means for multiplexing the first image data input by the input means and the first or second character data selected by the selection means to produce first multiplex image data; and
   second multiplexing means for multiplexing the second image data output from the resolution converting means and the first character data output from the character data producing means to produce second multiplex image data.

2. An apparatus according to claim 1, further comprising:
   display position changing means for changing an output timing of the first character data output from the character data producing means in order to change a display position of the first character data,
   wherein the selection means selects one of the first character data output from the display position changing means and the second character data.

3. An apparatus according to claim 2, wherein the first image data is different from the second image data in aspect ratio, and the display position changing means changes the output timing of the first character data in order to display the first character data in a predetermined display area in a display area of the first image data.

4. An apparatus according to claim 3, wherein the first multiplexing means multiplexes the second character data only with respect to a partial area obtained by enlarging a display area of the second image data in the display area of the first image data, and the predetermined display area is an area other than the partial area.

5. An apparatus according to claim 1, further comprising:
   masking means for masking a part of the first character data output from the character data producing means to output the data to the second multiplexing means,
   wherein the second multiplexing means multiplexes the first character data output from the masking means with the second image data output from the resolution converting means.

6. A signal processing method comprising:
- an input step of inputting first image data having a first resolution;
- a resolution converting step of converting the resolution of the first image data input in the input step to output second image data having a second resolution which is lower than the first resolution;
- a character data producing step of producing first character data in accordance with the second resolution;
- an enlargement step for enlarging the first character data output in the character data producing step to produce second character data in accordance with the first resolution;
- a selection step of selecting one of the first character data produced in the character data producing step and the second character data output in the enlargement step;
- a first multiplexing step of multiplexing the first image data input in the input step and the first or second character data selected in the selection step to produce first multiplex image data; and
- a second multiplexing step of multiplexing the second image data output in the resolution converting means and the first character data output in the character data producing step to produce second multiplex image data.

7. A method according to claim 6, further comprising:
- a display position changing step of changing an output timing of the first character data output in the character data producing step in order to change a display position of the first character data,
- wherein the selection step selects one of the first character data output in the display position changing step and the second character data.

8. A method according to claim 7, wherein the first image data is different from the second image data in aspect ratio, and the display position changing step changes the output timing of the first character data in order to display the first character data in a predetermined display area in a display area of the first image data.

9. A method according to claim 8, wherein the first multiplexing step multiplexes the second character data only with respect to a partial area obtained by enlarging a display area of the second image data in the display area of the first image data, and the predetermined display area is an area other than the partial area.

10. A method according to claim 6, further comprising:
- a masking step of masking a part of the first character data output in the character data producing step to output the data to the second multiplexing means,
- wherein the second multiplexing step multiplexes the first character data output in the masking step with the second image data output in the resolution converting step.

11. A storage medium which computer-readably stores a program for causing a signal processing apparatu to execute a signal processing method of any one of claims 6 to 10.

* * * * *